Nov. 27, 1934. F. R. ERBACH Re. 19,385

CIRCUIT CONTROL MECHANISM FOR MECHANICAL REFRIGERATING APPARATUS

Original Filed Dec. 19, 1927

Frederick R. Erbach

INVENTOR

BY William F. Sweezy his ATTORNEY

Reissued Nov. 27, 1934

Re. 19,385

UNITED STATES PATENT OFFICE 19,385

CIRCUIT CONTROL MECHANISM FOR MECHANICAL REFRIGERATING APPARATUS

Frederick R. Erbach, Beloit, Wis., assignor to Kelvinator Corporation, Detroit, Mich., a corporation of Michigan Original No. 1,824,774, dated September 29, 1931, Serial No. 241,072, December 19, 1927. Application for reissue March 21, 1933, Serial No. 661,948

12 Claims. (Cl. 62—4)

Figure 1:
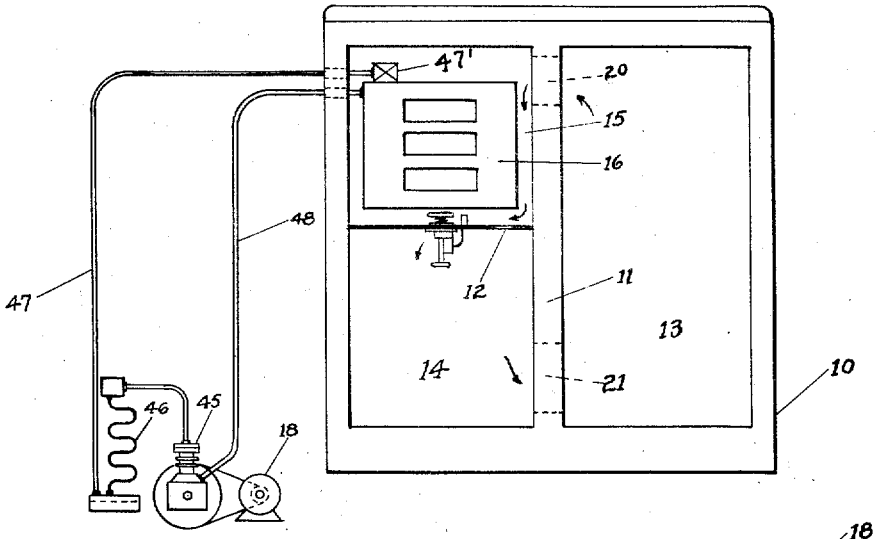

Mechanical refrigerating apparatus now associated with refrigerators operate to automatically maintain a predetermined temperature. Various mechanisms may be employed for maintaining the desired temperature and one now in general use is a temperature responsive mechanism which makes and breaks the electrical circuit leading from a source of electrical supply to the motor for driving a compressor. A cooling unit is arranged in communication with the chamber to be cooled and compartments for receiving trays containing liquids to be frozen are usually arranged interiorly of the cooling unit. The refrigerating apparatus normally operates to maintain the cooling unit at a desired temperature. It is desirable, at times, to obtain temporarily a different temperature for example, considerable time is required to freeze the liquids in the trays when the temperature maintained in the storage compartment of a refrigerator is above freezing, and under some circumstances it is desirable to procure quicker freezing than that resulting from apparatus set to automatically maintain a temperature above freezing.

An object of the invention is to provide a refrigerating system, the cooling unit of which is normally maintained at a predetermined temperature, and in which the operation of the system may be modified at selected intervals to temporarily produce a different temperature of the cooling unit, including provisions operated automatically in response to such modified temperature to restore the system to its normal operating condition.

Another object of my invention is to procure modified operation of automatically actuated mechanical refrigerating apparatus, normally operating intermittently, in order to decrease the time for freezing liquids within a refrigerator.

A further object of my invention is to associate mechanism with automatic mechanical refrigerating apparatus, normally operating intermittently, which can be manually moved into a position to cause a modified operation of the refrigerating apparatus, and which is automatically returned to its original position when a predetermined modified temperature is effected in the refrigerator by the modified operation of the apparatus.

Another object of my invention is to utilize an air circulation control damper in a refrigerator for effecting operation of a switch mechanism associated in the electrical circuit extending from a source of electrical supply to a driving motor.

Other objects of my invention more or less incidental or ancillary to the foregoing will appear in the following description which sets forth, in connection with the drawing accompanying and forming a part of this specification, a preferred embodiment of the invention.

Figure 2:
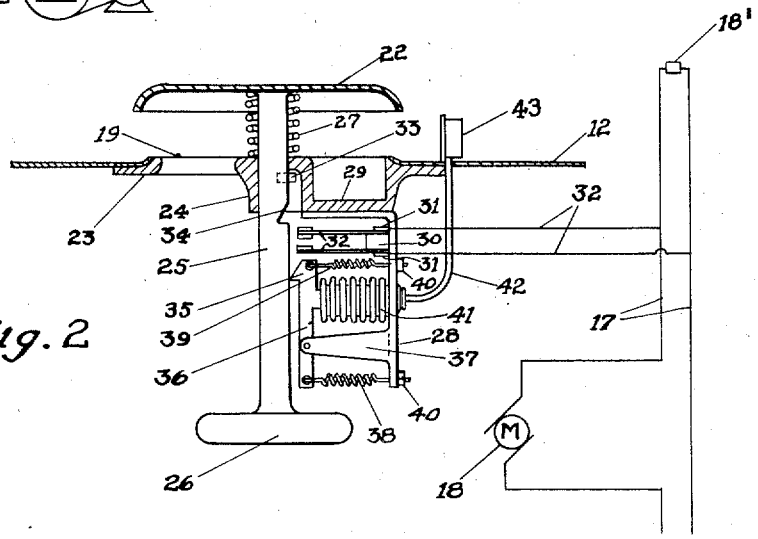

In the accompanying drawing:

Figure 1 is a front elevation of a refrigerator cabinet having a mechanical cooling unit in one compartment and my control device associated with a flue therein through which the air circulates, the doors of the cabinet being removed; and Figure 2 is an elevational view of my invention, partially diagrammatic, associated with the adjacent portion of the refrigerator cabinet, which is shown in section.

Referring now to the drawing by characters of reference, 10 illustrates a refrigerator cabinet having an interior chamber divided by vertical partition 11 and a horizontal partition 12 providing food storage chambers 13 and 14 and a chamber 15 for the reception of the heat transfer unit 16 of mechanical refrigerating apparatus. The mechanical refrigerating apparatus can be of the compressor-condenser-evaporator type having an electrical circuit 17 extending through a motor 18 which operates the compressor 45. The compressor is connected to a condenser 46 from which a conduit 47 extends to the heat transfer or cooling unit 16, the condensed refrigerant passing through a pressure reducing valve 47′ interposed between the condenser and the cooling unit. Evaporated refrigerant returns from the unit 16 to the compressor through a conduit 48. This structure per se forms no part of my invention and is well known in the art. The partition 12 is provided with a flue 19 and the partition 11 is provided with upper and lower flues 20 and 21, the flues allowing a circulation of air through the chambers. The structure so far described is so generally known and understood that a more complete disclosure and further description of the details is not thought to be necessary to understand my invention which is associated therewith, and which I will now describe.

The present invention is directed to a refrigerating apparatus or system which normally maintains a desired temperature and which can be modified for temporarily obtaining a modified temperature. One specific use of the present invention will be apparent from the following:

The automatic control of refrigerating apparatus, in maintaining a predetermined temperature range above freezing in the food storage compartments, will start and stop several times before water or fluids will be frozen after insertion into the open chambers in the cooling unit, and therefore an objectionable length of time is required for the freezing operation. In order to decrease the freezing time normally required by automatically operated mechanical refrigerating apparatus, I have provided mechanism for causing the refrigerating apparatus to operate continuously until a predetermined low temperature is obtained in the cooling chamber which mechanism is arranged to be associated with an air circulation control damper 22. This mechanism is arranged in a circuit parallel to that of the thermostat 18′ and consequently is not affected by the operation of that element. A reinforcing collar 23 is secured to the partition 12 adjacent the flue opening 19 therein, and such member is provided with a bearing portion 24 and a surrounding opening which permits air to circulate from the chamber 15 to the chamber 14. The damper 22 is preferably arranged within the chamber 15 and is of such size that it can close the opening in the member 23 to shut off air circulation between the chambers 15 and 14. The damper is provided with a stem portion 25 which extends through the bearing 24 and into the chamber 14, the stem terminating in a handle portion 26. A coil spring 27 surrounds the stem portion of the damper structure intermediate the closure member 22 and the bearing member 24. Such spring normally maintains the closure member in open position with respect to the flue 19.

A motor control device is arranged to be actuated by the movement of the damper, and the mechanical portion thereof is carried by a bracket 28 which is attached to a depending portion 29 of the member 23. A switch base 30, formed of insulating material, is secured to the upper portion of the bracket 28 and terminals 31 project from opposite sides thereof and are connected by electrical conductors 32 with the electrical circuit 17 leading to the motor 18, the connections between the conductors 32 and the circuit 17 being arranged so that a complete circuit will be established regardless of the relation of the thermostatically actuated mechanism 18′. Resilient switch contact arms 32′ are also attached to the terminals 31 and project therefrom in spaced and parallel relation toward the stem portion 25 of the damper. The damper stem is provided with a projecting portion 33 which is arranged to engage and actuate the upper contact arm and move it into engagement with the lower contact arm when the damper is pulled downwardly to close the flue opening 19. It will thus be seen that when the damper is moved to closed position, the top switch arm 32′ will be forced thereby into engagement with the other switch arm, thus establishing an electrical circuit through the motor 18 which will cause continuous operation of the refrigerating apparatus until such time as the damper is moved to open position.

The damper stem is provided with a notch 34 which is engaged by a pawl 35 formed at the upper end of the lever 36 when the damper is moved to closed position. The lever is pivoted adjacent its lower end between the bracket extensions 37, and coil springs 38 and 39 extend between and are secured to the ends of the lever 36 and the bracket 28, the ends of the springs extending through the bracket 28 and being threaded to receive securing nuts 40. The relative tension of the springs 38 and 39 and the mounting of the lever 36 is such that the pawl 35 will automatically move into the notch 34 when the notch is moved to a position opposite the pawl, in which position the damper will be in a position to close the flue opening 19. It will be seen that the stem portion of the damper extends into the chamber 14, so that the handle portion 26 can be readily grasped when the refrigerator door is open in order to move the damper downwardly into a position in which it will close the flue opening in the partition 12. When the damper is manually moved to closed position, the pawl 35 engages the notch 34 in the damper stem and automatically maintains the damper in closed position until released. A thermostat device is associated with the lever 36 for releasing the pawl from the notch in the damper arm when a predetermined low temperature has been reached within the chamber 15. This device consists of a bellows member 41 which is closed at one end and engages with an extension of the lever 36. The bellows is secured to the bracket 28 and a conduit 42 communicating leads from the bellows 41 to the housing 43. It will be understood that a suitable expansible fluid is placed within the bellows and the communicating conduit 42 and housing 43 which will be affected by the temperature in the chamber 15 causing the bellows 41 to contract and expand, so that when a predetermined freezing temperature has been reached in the chamber 15, the movement of the bellows toward the bracket 28 moving the lever 36 therewith releases the pawl 35 from the notch 34 in the damper stem allowing the switch arms to separate as the damper stem is moved by the spring 27 to open position.

It will be understood that when a freezing temperature is produced in the chamber 15 and the air is permitted to circulate, then food stored within the chambers 13 and 14 will be frozen and spoiled. By arranging the damper so that it cooperates with the circuit control mechanism, it will be seen that the damper will be closed when the circuit is established to produce a lower temperature in the compartment than is permitted when under the control of thermostat 18′, and in this manner circulation of air when the lower temperature for freezing is desired will be prevented. Under such circumstances there will be very little likelihood of the air within the food storage chambers becoming cold enough to freeze and spoil the food stored therein. The thermostat bellows can be adjusted to release the pawl so that the desired temperature in the chamber 15 can be obtained by the relative adjustment of the tension of the springs 39.

Although I have illustrated but one form of my invention and have described in detail but a single application thereof, it will be apparent to those skilled in the art that it is not so limited but that various modifications and changes may be made therein without departing from the spirit of my invention or the scope of the appended claims.

What I claim is:

1. In combination with refrigerating apparatus having electrical connections for establishing a circuit between a driving motor and a source of electrical supply, an automatically operated switch mechanism for establishing and breaking said circuit upon predetermined temperature conditions and a second switch mechanism for controlling said circuit independently of said automatically operated switch mechanism, said last mentioned switch mechanism being manually operable to establish said circuit and including means for automatically breaking said circuit under a predetermined temperature condition.

BEST AVAILABLE COPY

2. In combination with refrigerating apparatus having electrical connections for establishing a circuit between a driving motor and a source of electrical supply, an automatically operated switch mechanism for establishing and breaking said circuit upon predetermined temperature conditions, a manually operable mechanism for establishing said circuit independently of said switch mechanism, and automatic means for breaking the circuit established by said manually operable means.

3. In combination with refrigerating apparatus having electrical connections for establishing a circuit between a driving motor and a source of electrical supply, automatically operated switch mechanism responsive to close and break said circuit upon predetermined temperature conditions, and a second switch mechanism adapted to close and break said circuit independently of said first switch mechanism, said second switch being manually operable to close the circuit and automatically operated to break the circuit upon a lower temperature than effected by said first mentioned switch mechanism.

4. Control mechanism for an electrical circuit associated with refrigerating apparatus, comprising in combination a switch mechanism in said circuit, an air circulation control damper for causing actuation of said switch mechanism to make and break said circuit, said damper being manually actuated to prevent air circulation and to move said switch to close said circuit, said damper being automatically moved to permit air circulation and to permit said switch to move position, and a thermostat connected to allow automatic movement of said damper.

5. Control mechanism for an electrical circuit associated with refrigerating apparatus comprising the combination of a switch, an air circulation damper arranged to actuate said switch, said damper being manually operable to prevent circulation of air and to close said switch, a latch for retaining said damper in switch closing position, a thermostat associated to release said latch from said damper upon a predetermined temperature condition, and a spring for automatically returning said damper to a position permitting opening of said switch and circulation of air.

6. In a refrigerating system, the combination with a refrigerant fluid condensing unit, a freezing compartment, a cooling compartment, and openings for the circulation of air between the compartments, of means for preventing such circulation of air and for initiating the operation of the condensing unit simultaneously, and means for rendering the last mentioned means inoperative when the temperature of the freezing compartment reaches a predetermined sub-normal value.

7. In combination with refrigerating apparatus having electrical connections for establishing a circuit between a driving motor and a source of electrical supply, an automatically operated switch mechanism for establishing and breaking said circuit upon predetermined temperature conditions, and a second switch mechanism for controlling said circuit independently of said automatically operated switch mechanism, said last mentioned switch mechanism being manually operable in one direction to control said circuit and including means for automatically restoring the switch to its initial position in response to a predetermined temperature condition.

8. In combination with refrigerating apparatus having electrical connections for establishing a circuit between a driving motor and a source of electrical supply, an automatically operated switch mechanism for establishing and breaking said circuit upon predetermined temperature conditions, a manually operable mechanism for controlling said circuit independently of said switch mechanism and automatic means for restoring the manually operable mechanism to its original position.

9. In combination with refrigerating apparatus having electrical connections for establishing a circuit between a driving motor and a source of electrical supply, automatically operated switch mechanism responsive to close and break said circuit upon predetermined temperature conditions, and a second switch mechanism adapted to close and break said circuit independently of said first switch mechanism, said second switch being manually operable to one circuit controlling position and automatically operated to another circuit controlling position upon the attainment of a different temperature than that influencing said first mentioned switch mechanism.

10. A refrigerating system comprising a cooling unit, means for circulating a refrigerant medium through said unit and operable to maintain a predetermined normal cooling unit temperature, means for temporarily modifying the operation of the circulating means and a temperature responsive device responsive solely to temperatures other than those normally maintained in the cooling unit for automatically reconditioning the system for normal operation.

11. A refrigerating system comprising a cooling unit, means for circulating a refrigerant medium through said unit, temperature responsive apparatus for controlling said means to maintain a predetermined temperature in said unit, and means for temporarily obtaining a different temperature in the cooling unit by modifying the operation of said circulating means, said means including a temperature responsive device responsive solely to said different temperature for automatically restoring the system to the normal control of said temperature responsive apparatus.

12. A refrigerating system comprising a cooling unit, means for circulating a refrigerating medium through said unit, temperature responsive apparatus for controlling the circulating cycles of said medium to maintain said unit between predetermined temperature limits, manually operated means for modifying one of said temperature limits, and second temperature responsive apparatus operated automatically in response to a predetermined modified limit of temperature of said cooling unit for automatically conditioning the system to again maintain the cooling unit between said predetermined temperature limits.

FREDERICK R. ERBACH.